United States Patent
Quines et al.

(10) Patent No.: US 8,446,688 B1
(45) Date of Patent: May 21, 2013

(54) DRIVE WITH CIRCUMFERENTIAL DISK LIMITER

(75) Inventors: Raymond Quines, San Jose, CA (US); Baekho Heo, San Jose, CA (US); Enoch Mylabathula, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 275 days.

(21) Appl. No.: 12/826,561

(22) Filed: Jun. 29, 2010

(51) Int. Cl.
*G11B 33/14* (2006.01)

(52) U.S. Cl.
USPC .................................................. 360/97.14

(58) Field of Classification Search
USPC ............ 360/97.12, 97.13, 97.14, 97.15, 97.2, 360/98.01
See application file for complete search history.

(56) References Cited

U.S. PATENT DOCUMENTS

| | | |
|---|---|---|
| 4,939,611 A | 7/1990 | Connolly |
| 5,231,549 A | 7/1993 | Morehouse et al. |
| 5,239,431 A | 8/1993 | Day et al. |
| 5,453,889 A | 9/1995 | Alt |
| 5,541,791 A | 7/1996 | Yamasaki et al. |
| 5,625,514 A | 4/1997 | Kubo et al. |
| 5,640,290 A | 6/1997 | Khanna et al. |
| 5,757,587 A | 5/1998 | Berg et al. |
| 5,801,899 A | 9/1998 | Genheimer |
| 5,864,444 A | 1/1999 | Baker et al. |
| 5,903,409 A | 5/1999 | Allen et al. |
| 5,959,807 A | 9/1999 | Jurgenson |
| 6,055,134 A | 4/2000 | Boutaghou |
| 6,084,744 A | 7/2000 | Genheimer et al. |
| 6,115,214 A | 9/2000 | Allsup et al. |
| 6,137,658 A | 10/2000 | Matsuzaki et al. |
| 6,172,843 B1 | 1/2001 | Genheimer et al. |
| 6,208,484 B1 * | 3/2001 | Voights ...................... 360/99.13 |
| 6,215,628 B1 | 4/2001 | Boutaghou |
| 6,226,144 B1 | 5/2001 | Nagl et al. |
| 6,236,531 B1 | 5/2001 | Allsup et al. |
| 6,271,987 B1 | 8/2001 | Allsup et al. |
| 6,341,051 B2 | 1/2002 | Hachiya et al. |
| 6,351,344 B1 | 2/2002 | Krum et al. |
| 6,351,350 B1 | 2/2002 | Symons et al. |
| 6,417,986 B1 | 7/2002 | Tran et al. |
| 6,424,487 B2 | 7/2002 | Nagl et al. |
| 6,452,753 B1 | 9/2002 | Hiller et al. |
| 6,473,270 B1 | 10/2002 | McDonald et al. |
| 6,477,000 B1 | 11/2002 | Pottebaum et al. |
| 6,556,383 B2 | 4/2003 | Murphy et al. |
| 6,624,966 B1 | 9/2003 | Ou-Yang et al. |
| 6,765,762 B2 * | 7/2004 | Yanagihara ................. 360/254.8 |
| 6,781,791 B1 | 8/2004 | Griffin et al. |
| 6,791,790 B2 | 9/2004 | Lee |
| 6,891,696 B1 * | 5/2005 | Ou-Yang et al. ........... 360/99.16 |

(Continued)

FOREIGN PATENT DOCUMENTS

| | | |
|---|---|---|
| EP | 1 615 224 B1 | 9/2009 |
| JP | 62088195 A | 4/1987 |

(Continued)

*Primary Examiner* — Angel Castro

(57) ABSTRACT

Described herein is a disk drive having a disk receiving surface with an outer diameter. The drive can include a peripheral edge that extends transverse to the disk receiving surface and circumferentially about at least a portion of the outer diameter of the disk receiving surface. The drive can also include a disk limiter that extends between and transverse to the disk receiving surface and the peripheral edge to provide a transition between the disk receiving surface and a surface of the peripheral edge.

17 Claims, 6 Drawing Sheets

U.S. PATENT DOCUMENTS

| | | | |
|---|---|---|---|
| 6,894,867 B2 * | 5/2005 | Hong et al. | 360/97.15 |
| 6,917,491 B2 | 7/2005 | Choi | |
| 6,930,857 B1 | 8/2005 | Lin et al. | |
| 6,961,207 B2 | 11/2005 | Kang et al. | |
| 7,085,098 B1 * | 8/2006 | Yang et al. | 360/97.13 |
| 7,136,246 B2 | 11/2006 | Khanna et al. | |
| 7,256,959 B2 | 8/2007 | Morioka | |
| 7,274,537 B2 | 9/2007 | Fan et al. | |
| 7,307,811 B2 | 12/2007 | Xu et al. | |
| 7,310,199 B2 | 12/2007 | Pottebaum et al. | |
| 7,327,530 B2 | 2/2008 | Lee et al. | |
| 7,428,741 B2 * | 9/2008 | Kim et al. | 720/648 |
| 7,457,078 B2 * | 11/2008 | Fukaya et al. | 360/97.14 |
| 7,474,500 B2 | 1/2009 | Kim | |
| 7,529,062 B2 | 5/2009 | Xu | |
| 7,530,082 B2 | 5/2009 | Chang | |
| 7,570,453 B2 | 8/2009 | Kim et al. | |
| 7,602,586 B2 * | 10/2009 | Kim et al. | 360/254.7 |
| 7,751,145 B1 | 7/2010 | Lin et al. | |
| 7,839,602 B2 | 11/2010 | Dunckley et al. | |
| 7,961,426 B2 * | 6/2011 | Naruse | 360/99.2 |
| 8,009,384 B1 | 8/2011 | Little | |
| 8,089,733 B2 | 1/2012 | Ng et al. | |
| 8,194,346 B2 | 6/2012 | Kubo | |
| 8,289,646 B1 | 10/2012 | Heo et al. | |
| 2001/0012174 A1 * | 8/2001 | Imamura | 360/97.01 |
| 2003/0151848 A1 | 8/2003 | Lee | |
| 2004/0085676 A1 | 5/2004 | Aoishi et al. | |
| 2005/0057854 A1 | 3/2005 | Khanna et al. | |
| 2005/0190488 A1 * | 9/2005 | Chan et al. | 360/97.02 |
| 2006/0005214 A1 * | 1/2006 | Kim et al. | 720/648 |
| 2006/0176608 A1 | 8/2006 | Xu et al. | |
| 2007/0081269 A1 | 4/2007 | Kim et al. | |
| 2010/0177442 A1 | 7/2010 | Ng et al. | |
| 2011/0255190 A1 | 10/2011 | Lee et al. | |

FOREIGN PATENT DOCUMENTS

| | | |
|---|---|---|
| JP | 06236670 A | 8/1994 |
| JP | 08297817 A | 11/1996 |
| JP | 2000149493 A | 5/2000 |
| JP | 2000268485 A | 9/2000 |
| JP | 2003249053 A | 9/2003 |
| JP | 2003331562 A | 11/2003 |
| WO | WO 2004081942 A1 | 9/2004 |
| WO | WO 2007115453 A1 | 10/2007 |

* cited by examiner

DRIVE WITH CIRCUMFERENTIAL DISK LIMITER

BACKGROUND

Hard disk drives, (HDD) are often used in electronic devices, such as computers, to record data onto or to reproduce data from a recording media, which can be a disk having one or more recording surfaces. The HDD also includes a head for reading the data on a recording surface of the disk and for writing data unto one of the surfaces. An actuator is provided for moving the head over a desired location, or track of the disk.

The HDD includes a spindle motor for rotating the disk during operation. When the disk drive is operated, and the actuator moves the head over the disk, the head is floated a predetermined height above the recording surface of the disk while the disk is rotated, and the head detects and/or modifies the recording surface of the disk to retrieve, record, and/or reproduce data from and/or onto the disk.

When the HDD is not in operation, or when the disk is not rotating, the head can be rotated by the actuator to a position such that the head is not over the disk or the recording surfaces. In this non-operational configuration, the head is "parked off" of the recording surface of the disk.

BRIEF DESCRIPTION OF THE DRAWINGS

A general architecture that implements the various features of the disclosure will now be described with reference to the drawings. The drawings and the associated descriptions are provided to illustrate embodiments of the disclosure and not to limit the scope of the disclosure. Throughout the drawings, reference numbers are reused to indicate correspondence between referenced elements.

DETAILED DESCRIPTION

Figure 1:
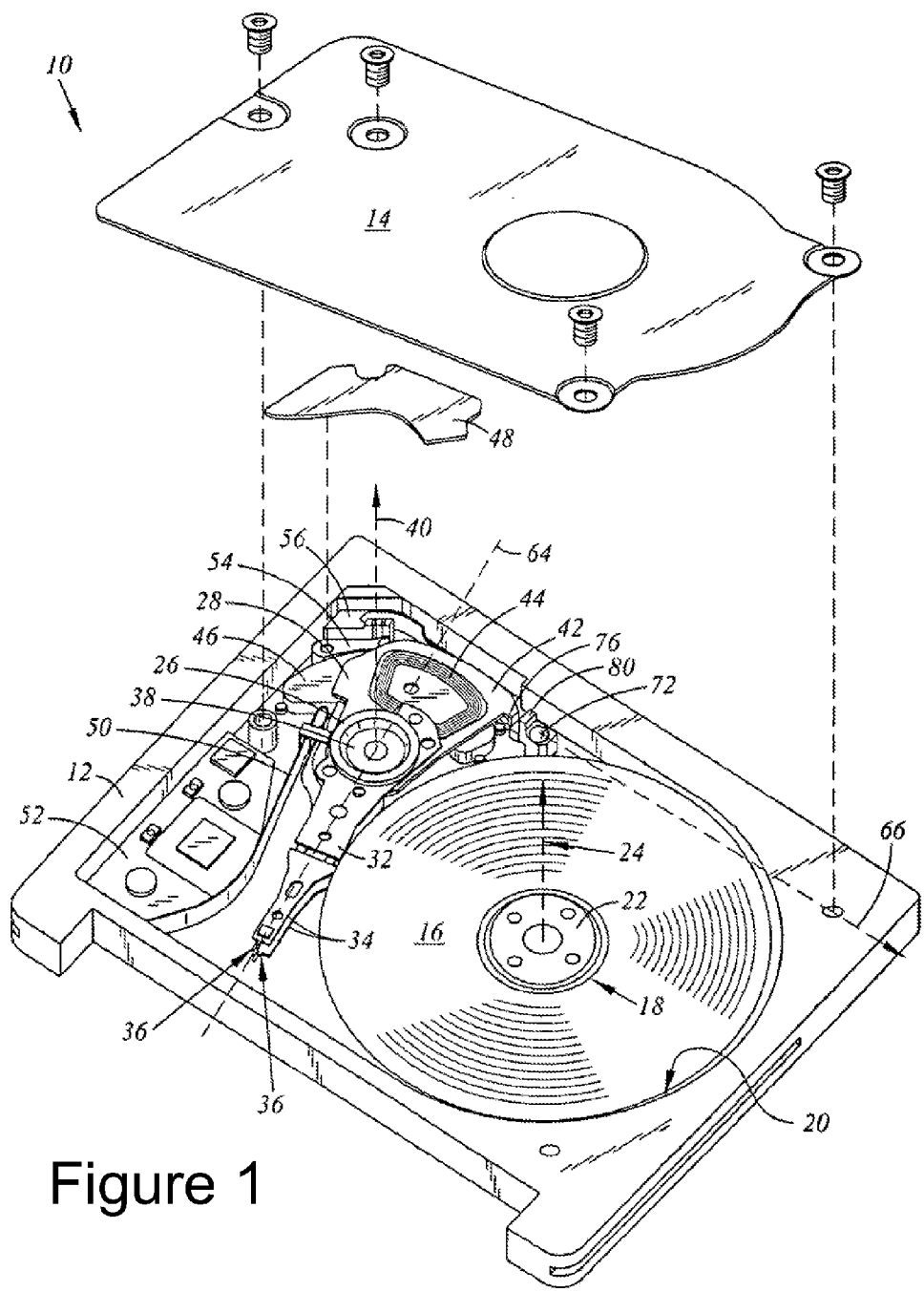
FIG. 1 depicts a perspective view of a disk drive in accordance with one embodiment.

Referring now to FIG. 1, there is depicted an exploded perspective view of a disk drive 10 according to embodiments described herein. The disk drive 10 includes a head disk assembly (HDA) and a printed circuit board assembly (PCBA). The head disk assembly includes a disk drive housing having disk drive housing members, such as a disk drive base 12 and a cover 14. The disk drive base 12 and the cover 14 collectively house at least one disk 16. A single disk or additional disks may be included in the disk drive.

The disk 16 includes an inner diameter (ID) 18 and an outer diameter (OD) 20. The disk 16 further includes a plurality of tracks on its recording surface, or face, for storing data. The disk 16 may be of a magnetic recording type of storage device, however, other arrangements (e.g., optical recording) may be utilized. The head disk assembly further includes a spindle motor 22 for rotating the disk 16 about a disk rotation axis 24. The head disk assembly further includes a head stack assembly 26 rotatably attached to the disk drive base 12 in operable communication with the disk 16. The head stack assembly 26 includes an actuator 28.

The actuator 28 includes an actuator body and at least one actuator arm 32 that extends from the actuator body. Some embodiments include multiple arms 32. Distally attached to the actuator arms 32 are suspension assemblies 34. The suspension assemblies 34 respectively support heads 36. The suspension assemblies 34 with the heads 36 are referred to as head gimbal assemblies. The number of actuator arms and suspension assemblies may vary depending upon the number of disks and disk surfaces utilized.

The head 36 can include a transducer for writing and reading data. The transducer can include a writer and a read element. In magnetic recording applications, the transducer's writer may be of a longitudinal or perpendicular design, and the read element of the transducer may be inductive or magnetoresistive.

In optical and magneto-optical recording applications, the head may also include an objective lens and an active or passive mechanism for controlling the separation of the objective lens from a disk surface of the disk 16. The disk 16 includes opposing disk surfaces. In magnetic recording applications the disk surface typically includes one or more magnetic layers. Data may be recorded along data annular regions on a single disk surface or both.

The head stack assembly 26 may be pivoted such that each head 36 is disposed adjacent to the various data annular regions from adjacent to the outer diameter 20 to the inner diameter 18 of the disk 16. In FIG. 1, the actuator body includes a bore, and the actuator 28 further includes a pivot bearing cartridge 38 engaged within the bore for facilitating the actuator body to rotate between limited positions about an axis of rotation 40.

The actuator 28 can further include a coil support element 42 that extends from one side of the actuator body opposite the actuator arms 32. The coil support element 42 is configured to support a coil 44. A VCM magnet 46 may be supported by the disk drive base 12. Posts may be provided to position the VCM magnet 46 in a desired alignment against the disk drive base 12. A VCM top plate 48 may be attached to an underside of the cover 14. The coil 44 is positioned, in some embodiments, between the VCM magnet 46 and the VCM top plate 48 to form a voice coil motor for controllably rotating the actuator 28.

The head stack assembly 26 can further include a flex cable assembly 50 and a cable connector 52. The cable connector 52 can be attached to the disk drive base 12 and is disposed in electrical communication with the printed circuit board assembly. The flex cable assembly 50 supplies current to the coil 44 and carries signals between the heads 36 and the printed circuit board assembly.

With this configuration, current passing through the coil 44 results in a torque being applied to the actuator 28. The actuator 28 includes an actuator longitudinal axis 64 which extends generally along the actuator arms 32. A change in direction of the current through the coil 44 results in a change in direction of the torque applied to the actuator 28, and consequently, the longitudinal axis 64 of the actuator arms 32 is rotated about the axis of rotation 40. It is contemplated that other magnet, VCM plate, coil and magnet support configurations may be utilized, such as a multiple coil arrangements, single or double VCM plates and a vertical coil arrangement.

The disk drive 10 can also include a latch 54. The latch 54 can include a fixed portion 56 that is firmly coupled to the disk drive base 12. The latch 54 further includes a latching portion that is engagable with fixed portion 56 to limit rotational movement of the actuator 28. Although the latch 54 is depicted as being located in a corner of the base, the latch 54 could be located in other portions of the disk drive and still perform its functions.

When the actuator 28 is rotated into the parked position, as illustrated in FIG. 1, the actuator 28 can include a contact member 76, which can be located on the coil support element 42 or elsewhere, that is configured to engage a crash stop 80 in order to limit rotation of the actuator 28 away from the disk 16. The crash stop 80 can be an integral part of the base 12, or the crash stop 80 can be connected to the base 12 via a fixation element 72. FIG. 1 depicts an axis of engagement 66 of the contact member 76 and the crash stop 80 as being in line with the fixation element 72, but other constructions are also permissible. A crash stop 80 can also be provided to limit movement of the actuator 28 toward the ID 18 of the disk 16.

Data is recorded onto a surface of the disk in a pattern of concentric rings known as data tracks. The disk surface is spun at high speed by means of a motor-hub assembly. Data tracks are recorded onto disk surface by means of the head 36, which typically resides at the end of the actuator arm 32. One skilled in the art understands that what is described for one head-disk combination applies to multiple head-disk combinations.

The dynamic performance of the HDD is a major mechanical factor for achieving higher data capacity as well as for manipulating the data faster. The quantity of data tracks recorded on the disk surface is determined partly by how well the head 36 and a desired data track can be positioned relative to each other and made to follow each other in a stable and controlled manner. There are many factors that can influence the ability of HDD to perform the function of positioning the head 36 and following the data track with the head 36. In general, these factors can be put into two categories; those factors that influence the motion of the head 36; and those factors that influence the motion of the data track. Undesirable motions can come about through unwanted vibration and undesirable tolerances of components.

During development of the HDD, the disk 16 and head 36 have undergone reductions in size. Much of the refinement and reduction has been motivated by consumer request and demand for more compact and portable hard drives 10. For example, the original hard disk drive had a disk diameter many times larger than those being developed and contemplated.

Smaller drives often have small components with relatively very narrow tolerances. For example, disk drive heads 36 are designed to be positioned in very close proximity to the disk surface. Due to the tight tolerances, vibration activity of the actuator arm 32 relative to the disk 16 can adversely affect the performance of the HDD. For example, vibration of the actuator 28 can result in variations in the spacing between the head element and media. Additionally, irregular movement of the disk 16, or vibrations caused by unbalanced rotations, can result in variations in the spacing between the head element and the disk 16, or media.

In addition, as disk drive tracks per inch (TPI) increases, sensitivity to small vibrations also increases. Small vibrations can cause significant off-track and degraded performances. For example, in many cases, variations in the spacing between the head element and media can increase the off-track complications, and the increase in TPI compounds the complications and likely gives rise to data errors. These data errors can include both hard errors during writing and soft errors during reading. Moreover, vibration-induced errors become even more apparent as the actual offset distances and overall components are reduced in size.

Figure 2:
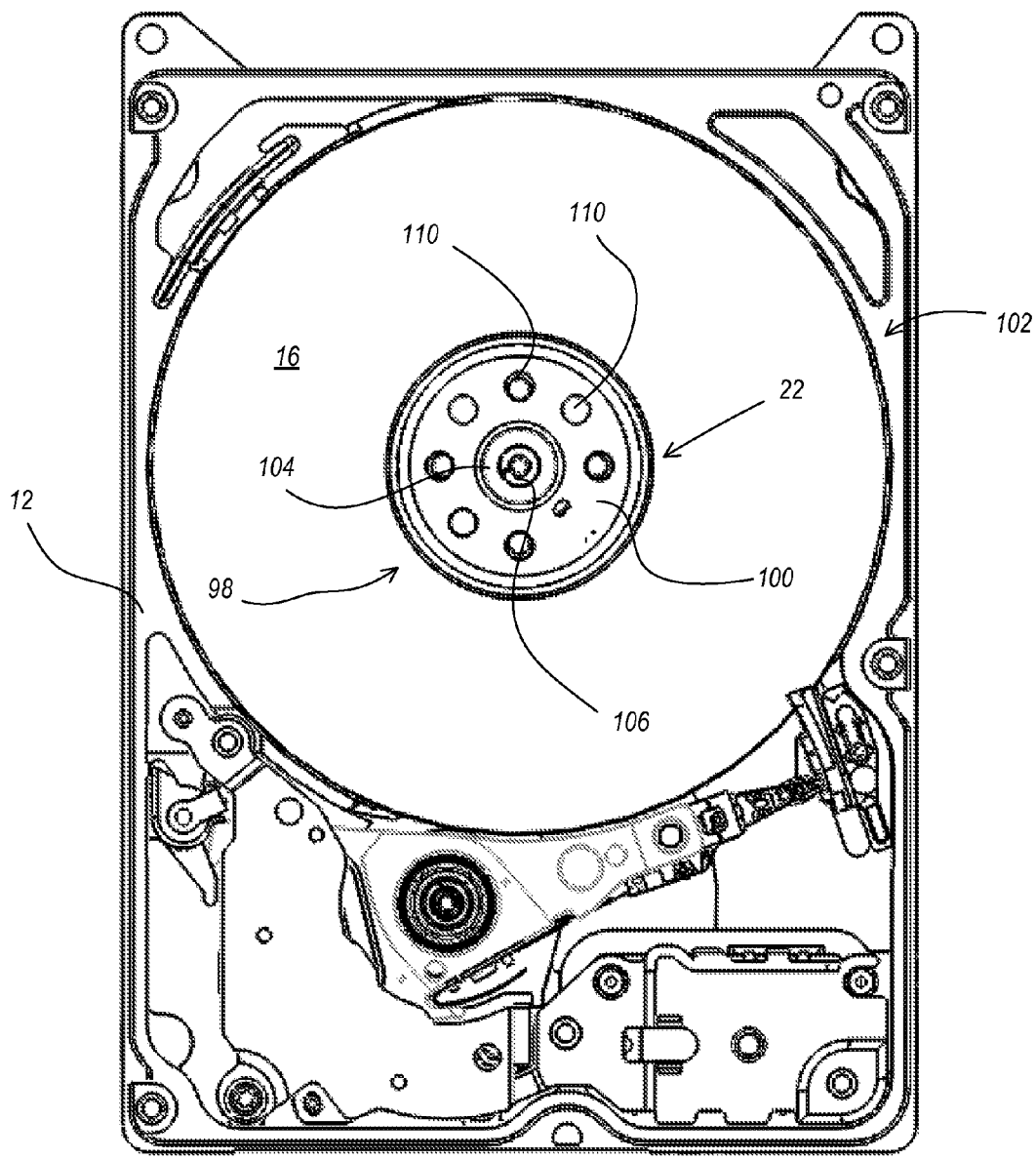
FIG. 2 illustrates a top view of a disk drive in accordance with one embodiment.

Each disk 16 is mounted on a rotatable hub 98 connected to the spindle motor 22 and is secured to the rotatable hub by a disk clamp 100, as illustrated in FIG. 2. Some disk drives 10 include a plurality of disks 16 to provide additional disk surface for storing greater amounts of data. The resulting combination is referred to herein as a motor/disk assembly or as a disk pack 102.

Multiple data storage disks 16 can be mounted on the rotatable hub 98 in vertically and substantially equally spaced relations. One or more bearings 104 are disposed between a motor or spindle shaft 106 and the rotatable hub 98, which is disposed about and rotatable relative to the spindle shaft 106. Electromagnetic forces are used to rotate the hub 98 about the stationary shaft 106 at a desired velocity. Rotational movement of the hub 98 is translated to each of the disks 16 of the disk pack 102, causing the disks 16 to rotate with the hub 98 about the shaft 106.

The disks 16 are rotated about the shaft 106 at a high rate of speed, and consumer demand for quicker data retrieval can result in increased rotational speed of the hub 98 and the disks 16 to provide reduced time in accessing data. Even minor imbalances of the rotating motor/disk assembly 102 can generate significant forces that can adversely affect the ability to accurately position the head 36 relative to the desired track of the corresponding disk 16 while reading from or writing to the disk 16. Excessive imbalance can degrade the disk drive performance not only in terms of read/write errors, but also in terms of seek times. Excessive imbalance may result in an undesirable acoustic signature and may even result in damage or excessive wear to various disk drive components.

The inner diameter 18 of each disk 16 is slightly larger in diameter than an outer periphery of the spindle motor hub, or rotatable hub 98, in order to allow the disks 16 to slip about the spindle motor hub 98 during installation. During assembly, the disks 16 may be positioned in an inexact concentric manner about the spindle motor hub 98. In fact, in some instances, the disks 16 may be intentionally biased against the spindle motor hub 98. This inexact concentric relationship between the disk 16 and the motor hub 98 results in the disk pack 102 becoming imbalanced. This imbalance can be manifest in at least two respects.

First, the rotating mass of each disk 16 results in a centrifugal force radially extending in a direction from the axis of rotation 24 in a plane orthogonal to the axis of rotation 24 that includes the axis of rotation 24. This can be referred to as a single plane or "static" imbalance. Second, the same centrifugal force also results in a moment about an axis extending from the axis of rotation 24 in a plane orthogonal to the axis of rotation through the axis of rotation 24. This can referred to as a dual plane, two plane, or "dynamic" imbalance.

Balancing of the disk pack 102 is preferably conducted, for example, by the manufacturer or during an assembly process, prior to shipping the drive 10 to the consumer. Single plane balancing of the disk pack 102 can include attaching one or more weights to one side of the disk pack 102. Not all imbalances may be alleviated to the desired degree by balancing within a single plane. Dual plane balancing of the disk pack 102 can be achieved by attaching one or more weights at two different elevations along the axis 24 corresponding with vertically spaced reference planes in an attempt to improve upon the potential inadequacies of a single plane balance.

Balancing the disk pack 102 can be accomplished by attaching one or more weights to a central portion of the disk pack 102. For example, as illustrated in FIG. 2, the disk pack 102 can have a portion that holds the one or more weights or to which the one or more weights attach. FIG. 2 illustrates a disk pack 102 having a rotatable hub 98 that includes a disk clamp 100 having a plurality of disk clamp apertures 110 positioned circumferentially about a central portion of the disk pack 102.

Another source of vibrations caused during operation of the disk drive 10 can be rotation of the actuator 28 about the axis of rotation 40. As the actuator 28 rotates from the parked position to a position over the disks 16, the initiation of movement from its original stationary position and as the actuator 28 stops at the desired position over the disks 16 can create various vibration modes that can adversely affect performance of the disk drive 10. For example, one vibration mode includes the actuator Butterfly mode (BFM). Modes of vibration can also be encountered as the actuator 28 shifts and moves over the disks 16 during operation of the disk drive 10.

Another source of vibrations during disk operation is disk deformations and irregularities that are caused when non-operational shock subjects the disk 16 to very high inertial forces. When a disk 16 is subjected to such non-operational shocks, the disk can experience crack initiation, material yielding, and development of uneven surfaces. These changes in disk structure and profile can result in reduced disk performance because of damage to the recording surfaces of the media or because of vibrations caused by the disk deformations and irregularities.

When the disk 16 is subjected to high inertial forces, such as those experienced during a non-operational shock event, the disk 16 can deflect excessively and, in some instances, may contact the base 12. This contact can cause media damage, especially at the outer diameter 20 of the disk 16, and can reduce the ability of the heads 36 to read and/or write to the location of the disk 16 that has been damaged.

Disks 16 can be manufactured of many different materials. For example, the disks can be manufactured from aluminum and glass. Aluminum disks are heavier than glass disks and are consequently more susceptible to high inertial forces during a non-operational shock event. Additionally, aluminum is a softer material than glass, and aluminum disks can more susceptible to plastic deformation than glass disks when experiencing high inertial forces.

Some drives 10 can provide motion limiters on the top cover 14 to limit disk 16 deformation during non-operational shock. Providing such motion limiters can reduce the likelihood of disk 16 breakage during such events. Drives may not include motion limiters, in some embodiments, on the base when the drive 10 includes glass disks because disk deformation can be limited by the smaller base-to-disk gap. However, a base disk limiter can be advantageous, particularly used when used with aluminum disks, to limit excessive plastic deformation at the edge of the aluminum disk to reduce the likelihood of media damage.

Figure 3:
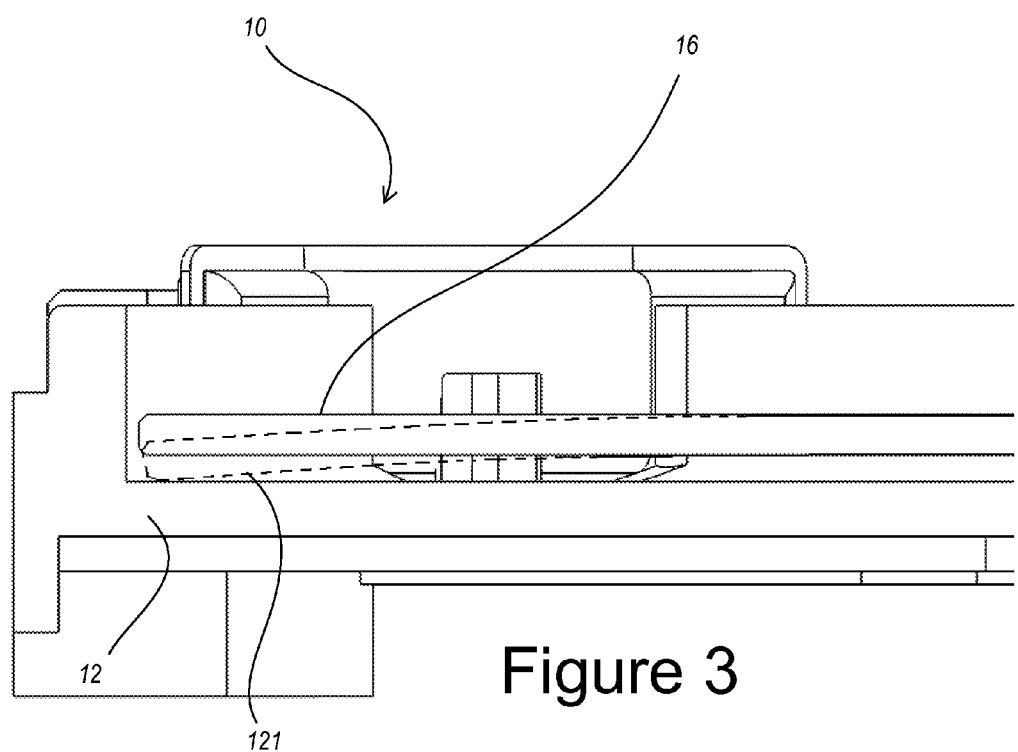
FIG. 3 illustrates a partial schematic cross-sectional view of a disk drive.

FIG. 3 illustrates a drive 10 with a disk 16 that rotates over the base 12. As can be seen, if the drive 10 were to experience a non-operational shock that generated high inertial forces, disk 16 could be deflected to contact the base 12, illustrated by the deflected disk 121. In doing so, the disk 16 could experience media damage, or damage that reduces the ability of the drive 10 to write to or read from the disk 16.

Figure 4A:
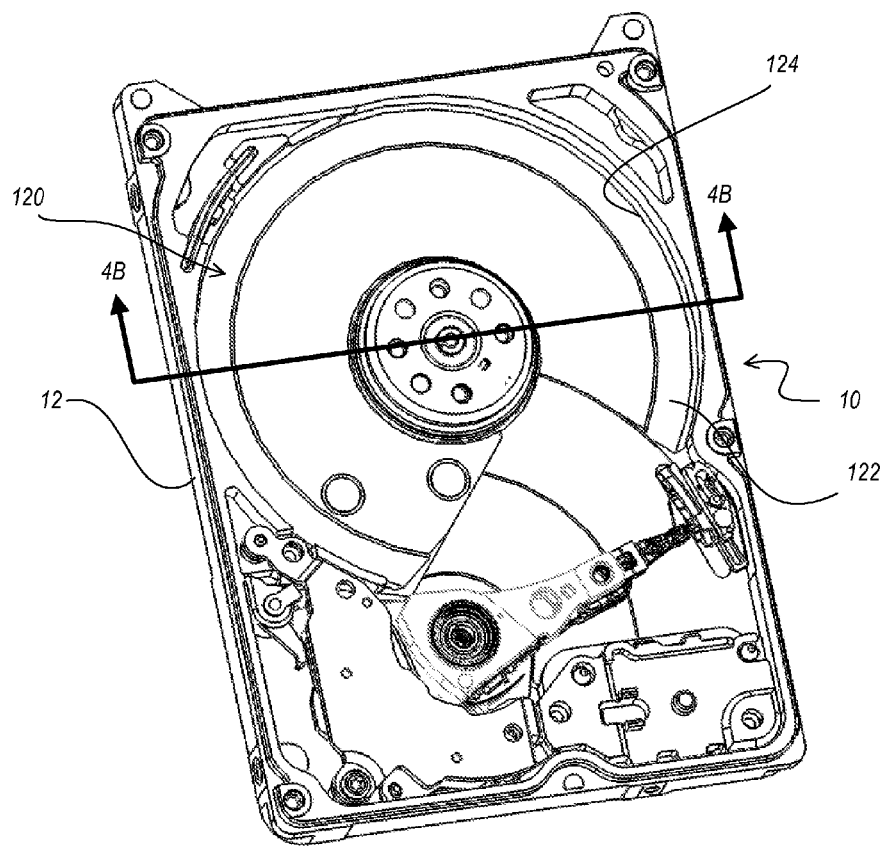
FIG. 4A illustrates a perspective view of a disk drive in accordance with one embodiment.

FIG. 4A illustrates a drive 10 having a base 12 that includes a disk receiving surface 120 over which the disks 16 rotate. The disk receiving surface 120 also provides means for coupling a disk pack, which includes the disks 16, to the base 12. The disk receiving surface 120 can extend in a plane that is substantially parallel to one or more planes defined by one or more of the disks when the disks are coupled to the base the disk receiving surface 120. The disk receiving surface 120 can also include a disk limiter 122 that extends at least partially circumferentially about a portion of the disk receiving surface 120 that corresponds to the outer diameter 20 of the disk 16 when the disk 16 are coupled to the base 12. The base 12 can also include a peripheral edge 124 that extends in some embodiments substantially perpendicular from the disk receiving surface 120.

Figure 4B:
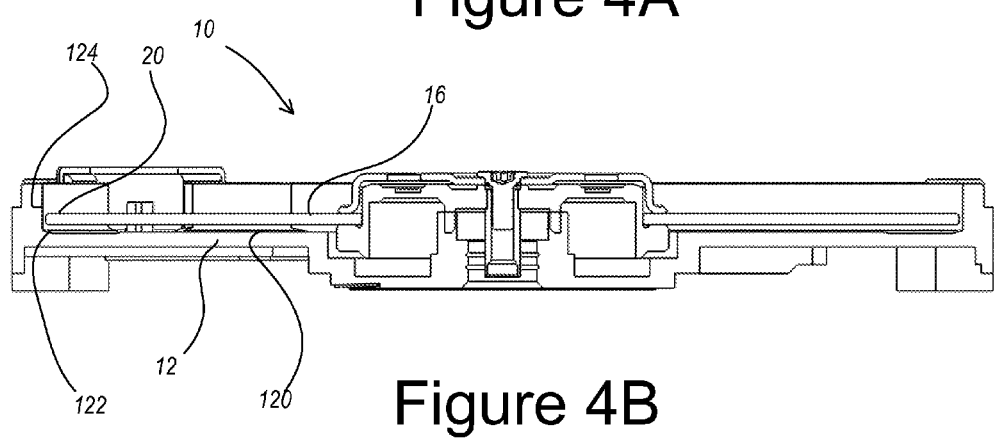
FIG. 4B illustrates a schematic cross-sectional view of the drive of FIG. 4A.

FIG. 4B illustrates a schematic cross-sectional view of the drive 10 of FIG. 4A. The drive includes a disk 16 that is rotationally coupled to the base 12, and the disk rotates over a disk receiving surface 120. Toward the outer diameter 20, the base 12 preferably defines a peripheral edge 124 that extends substantially perpendicular to the disk receiving surface 120. The disk limiter 122 can provide a transition between the disk receiving surface 120 and the peripheral edge 124, such that the disk limiter 122 extends in a plane that is transverse to a plane defined by the disk receiving surface 120. The disk limiter 122 can also, as depicted, extend in a plane that is transverse to a plane defined by the peripheral edge 124.

Figure 5:
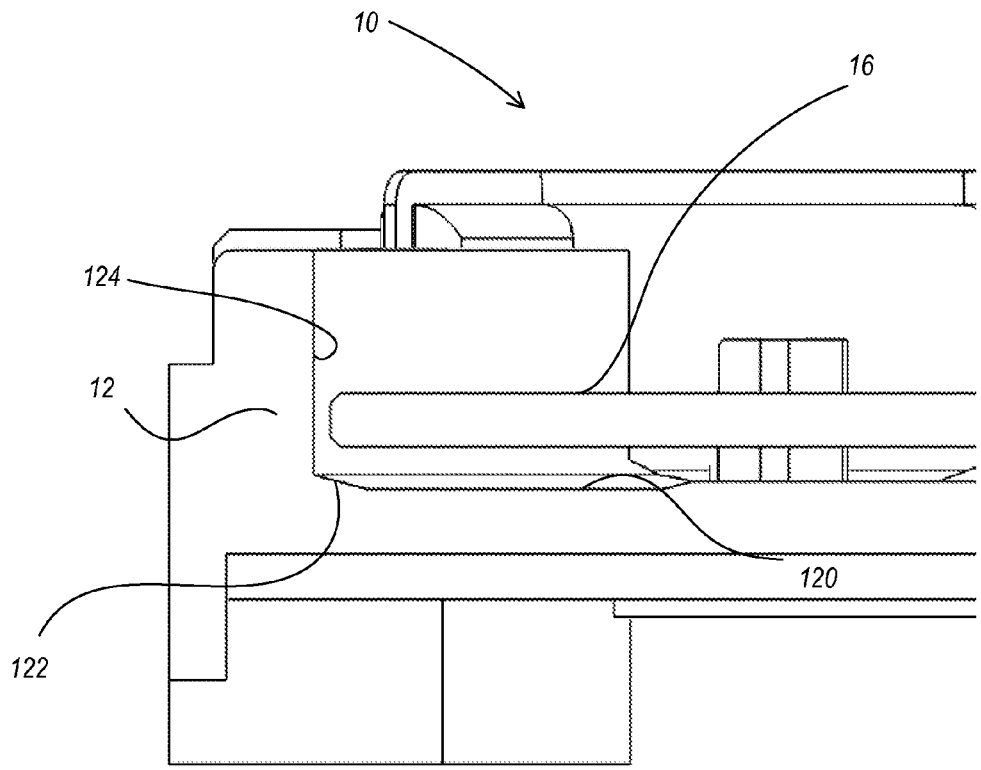
FIG. 5 depicts a partial schematic cross-section view of a disk drive in accordance with one embodiment.

FIG. 5 is a closer view of the disk limiter 122 depicted in FIG. 4B. As shown in FIG. 5, the disk limiter 122 can extend at an angle relative to the disk receiving surface 120. While FIG. 5 depicts the disk limiter 122 as extending in only one angle from the disk receiving surface 120, the disk limiter 122 can be extended in 1, 2, 3 or more angles from the disk receiving surface 120. Accordingly, the disk limiter 122 can have a gentle sloping region, where the disk limiter 122 extends at a relatively small angle with respect to the disk receiving surface 120, and the disk limiter 122 can have a second region, where the disk limiter 122 extends at a relatively larger angle with respect to the disk receiving surface 120. For example, the gentle sloping region may extend from the disk receiving surface 120 at an angle of between about 10° and about 20°, and the second region may extend at an angle, relative to the disk receiving surface 120 at an angle of between about 15° and about 40°. In some embodiments, the angle of the second region may be between about 20° and about 80°.

Figure 6:
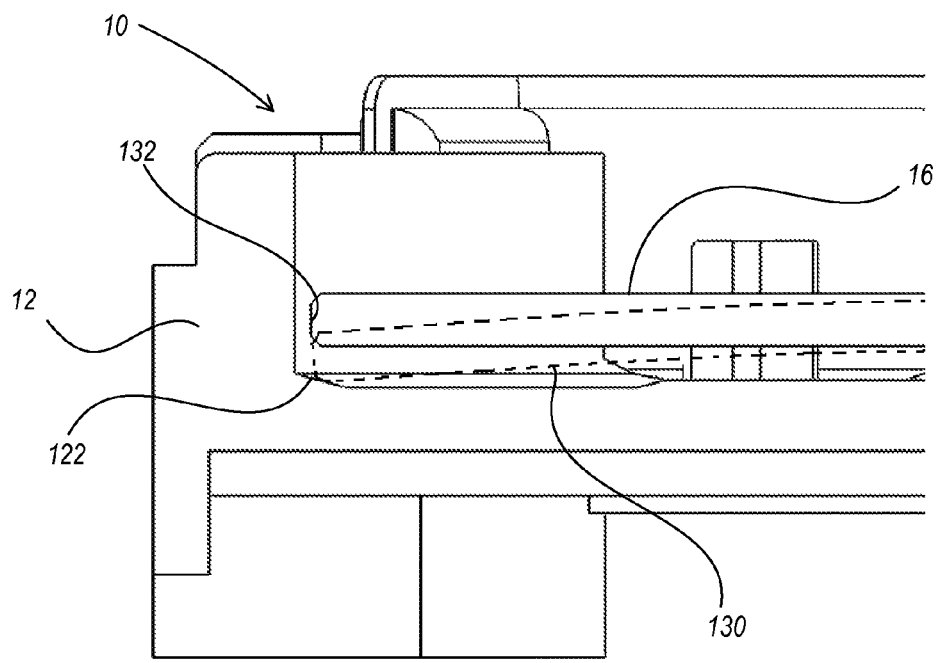
FIG. 6 depicts another partial schematic cross-section view of a disk drive in accordance with one embodiment.

As shown in FIG. 6, a deflecting disk 130 will preferably engage, or contact, the disk limiter 122 at an outer edge 132 of the disk 16. Accordingly, the likelihood of the recording surfaces of the disk 16 contacting the disk receiving surface 120 is reduced, thus reducing the likelihood of permanent damage to the disk 16.

In some embodiments, the disk limiter 122 can extend circumferentially about the outer diameter 20 of the disk 16 and provide a substantially uniform surface about the disk to contact the disk 16 if the disk deflects to contact the disk limiter 122. A substantially uniform surface spreads the inertial forces of the disk during a non-operational shock event such that the likelihood is reduced of the disk experiencing plastic deformation as a consequence of a localized deflection point. In such instances, even when plastic deformation occurs, the disk can deformed with less irregularities than if the drive included localized deflection points. For example, when the disk is deformed, it may provide less fluctuations along the recording surface.

Some embodiments of a drive 10 including a disk limiter 122 provide that the drive 10 can endure an additional 100 G force during a non-operational shock than a drive 10 that does not include such a disk limiter 122. Although the figures depict the disk limiter 122 as extending in a substantially straight line, or within a plane, the disk limiter 122 can also form a radial chamfer that has a radius of curvature that is substantially similar to that of the outer edge 132 of the disk 16. Accordingly, the disk limiter 122 can receive the profile shape of the disk outer edge 132 when the disk 16 plastically deforms to contact the disk limiter 122. In some embodiments, the disk limiter 122 can include a chamfer with the radius of curvature that is greater than the outer edge 132 of the disk 16.

In one embodiment, the disk drive 10 includes a disk 16 having a recording surface, an outer diameter 20, and an outer edge 132. The drive 10 includes a base 12 having a disk receiving surface 120, over which the disk 16 can be rotationally positioned and at which the disk 16 can be coupled to the base 12. The drive 10 also includes a disk limiter on the base that extends circumferentially about at least a portion of the outer diameter 20 of the disk 16, when the disk 16 is coupled to the base 12. The disk limiter is preferably sized, dimensioned, and configured to engage the outer edge 132 of the disk 16 when the disk 16 is deflected toward the disk receiving surface 120.

In some embodiments, the base 12 includes a peripheral edge 124 extending transversely from the disk receiving surface 120 about at least a portion of the outer diameter 20 of the disk 16 when the disk 16 is coupled to the base 12. The disk limiter 122 can provide a transition between the disk receiving surface 120 and a surface of the peripheral edge 124.

The disk limiter 122 preferably extends in a plane transverse to the disk receiving surface 120. In some embodiments, the disk limiter 122 extends at substantially a single angle from the disk receiving surface 120. In some embodiments, the angle is between about 10° and about 70°, and in some embodiments, the angle is between about 20° and about 40°.

Figure 7:
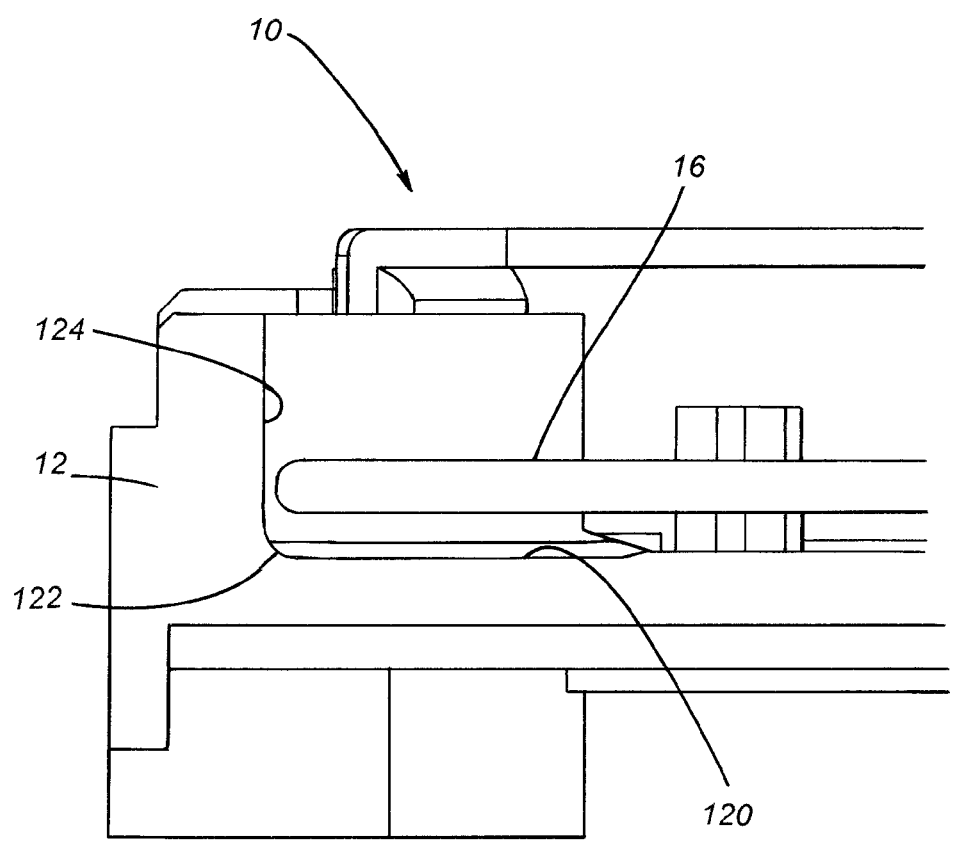
FIG. 7 depicts a partial schematic cross-section view of a disk drive in accordance with one embodiment.

Some embodiments provide that the disk limiter 122 includes a radial chamfer that extends from the disk receiving surface 120. For example, in one embodiment shown in FIG. 7, the disk outer edge 132 includes a radius of curvature, and the disk limiter 122 provides a curved shape, or a cross-sectional profile with a curved portion, with substantially the same radius of curvature as the disk outer edge.

In one embodiment, the disk limiter 122 extends circumferentially about between about 40% and about 80% of the disk outer diameter 20. In some embodiments, the disk limiter 122 extends circumferentially about between about 60% and about 80% of the disk outer diameter 20. In some embodiments, the disk limiter 122 is continuous as it extends about the disk outer surface 132, and in other embodiments, the disk limiter 122 is discontinuous, or includes discontinuous portions as it extends about the disk outer surface 132.

In some embodiments, the disk limiter 122 is formed integrally with the base. For example, the disk limiter 122 can be formed as a part of the disk drive during manufacture of the base 12. The limiter 122 can be formed by casting a base portion with the disk limiter 122 as part of the mold. Additionally, the limiter 122 can be formed by milling the base 12 with a bit that includes an edge chamfer.

Some embodiments provide a disk drive 10 having a disk receiving surface 120 having an outer diameter 20. The drive 10 can include a peripheral edge 124 that extends transverse to the disk receiving surface 120 and circumferentially about at least a portion of the outer diameter of the disk receiving surface 120. The drive can also include a disk limiter 122 that extends between and transverse to the disk receiving surface 120 and the peripheral edge 124 to provide a transition between the disk receiving surface and a surface of the peripheral edge. In some embodiments, the disk receiving surface 120 is configured to be substantially parallel to the disk recording surface on a disk 16 when the disk is coupled to the base 12.

The description of the invention is provided to enable any person skilled in the art to practice the various embodiments described herein. While the embodiments have been particularly described with reference to the various figures and disclosure, it should be understood that these are for illustration purposes only and should not be taken as limiting the scope of the inventions.

There may be many other ways to implement the embodiments. Various functions and elements described herein may be partitioned differently from those shown without departing from the spirit and scope of the disclosure. Various modifications to these embodiments will be readily apparent to those skilled in the art, and generic principles defined herein may be applied to other embodiments. Thus, many changes and modifications may be made to embodiments, by one having ordinary skill in the art, without departing from the spirit and scope of the disclosure.

A reference to an element in the singular is not intended to mean "one and only one" unless specifically stated, but rather "one or more." The term "some" refers to one or more. Any headings and subheadings are used for convenience only, do not limit the disclosure, and are not referred to in connection with the interpretation of the description of the disclosure. All structural and functional equivalents to the elements of the various embodiments described throughout this disclosure that are known or later come to be known to those of ordinary skill in the art are expressly incorporated herein by reference and intended to be encompassed by the disclosure. Moreover, nothing disclosed herein is intended to be dedicated to the public regardless of whether such disclosure is explicitly recited in the above description.

What is claimed is:

1. A disk drive comprising:
 a disk including a recording surface, an outer diameter, and an outer edge;
 a base including:
  a disk receiving surface, over which the disk can be rotationally positioned and at which the disk can be coupled to the base; and
  a peripheral edge extending transversely from the disk receiving surface about at least a portion of the outer diameter of the disk when the disk is coupled to the base; and
 wherein the disk drive further comprises a disk limiter on the base extending circumferentially about at least a portion of the outer diameter of the disk, when the disk is coupled to the base, the disk limiter sized and configured to engage the outer edge of the disk when the disk is deflected toward the disk receiving surface,
 wherein the disk limiter comprises an inclined surface extending from the disk receiving surface beneath the disk to a surface of the peripheral edge to provide a transition between the disk receiving surface and the surface of the peripheral edge.

2. The disk drive of claim 1, wherein the inclined surface extends at substantially a single angle from the disk receiving surface.

3. The disk drive of claim 2, wherein the angle is between about 10° and about 70°.

4. The disk drive of claim 2, wherein the angle is between about 20° and about 40°.

5. The disk drive of claim 1, wherein the inclined surface includes a radial chamfer extending from the disk receiving surface.

6. The disk drive of claim 1, wherein the disk outer edge comprises a radius of curvature, and the disk limiter comprises a curved shape with substantially the same radius of curvature as the disk outer edge.

7. The disk drive of claim 1, wherein the disk limiter extends circumferentially about between about 40% and about 80% of the disk outer diameter.

8. The disk drive of claim 1, wherein the disk limiter is formed integrally with the base.

9. A disk drive base comprising:

a disk receiving surface, over which a disk can be rotationally positioned and at which the disk can be coupled to the disk drive base, wherein the disk receiving surface includes an outer diameter;

a peripheral edge extending transverse to the disk receiving surface and circumferentially about at least a portion of the outer diameter of the disk receiving surface; and a disk limiter comprising an inclined surface extending from the disk receiving surface beneath the disk when the disk is coupled to the disk drive base to a surface of the peripheral edge to provide a transition between the disk receiving surface and the surface of the peripheral edge.

10. The disk drive base of claim 9, wherein the disk receiving surface is configured to be substantially parallel to a disk recording surface on the disk when the disk is coupled to the disk drive base.

11. The disk drive base of claim 10, wherein the disk limiter comprises a curved shape with a radius of curvature that is substantially the same as a radius of curvature of an outer edge of the disk.

12. The disk drive base of claim 9, wherein the inclined surface extends at substantially a single angle from the disk receiving surface.

13. The disk drive base of claim 12, wherein the single angle is between about 10° and about 70°.

14. The disk drive base of claim 12, wherein the single angle is between about 20° and about 40°.

15. The disk drive base of claim 9, wherein the inclined surface includes a radial chamfer extending from the disk receiving surface.

16. The disk drive base of claim 9, wherein the disk limiter extends circumferentially about between about 40% and about 80% of the disk receiving surface outer diameter.

17. The disk drive base of claim 9, wherein the disk limiter is formed integrally with at least one of the disk receiving surface and the peripheral edge.

* * * * *